United States Patent
Rakuljic

(10) Patent No.: US 8,953,240 B2
(45) Date of Patent: Feb. 10, 2015

(54) FREQUENCY-CHIRPED SEMICONDUCTOR DIODE LASER PHASE-LOCKED OPTICAL SYSTEM

(75) Inventor: George Rakuljic, Santa Monica, CA (US)

(73) Assignee: Telaris, Inc., Santa Monica, CA (US)

( * ) Notice: Subject to any disclaimer, the term of this patent is extended or adjusted under 35 U.S.C. 154(b) by 236 days.

(21) Appl. No.: 13/566,973

(22) Filed: Aug. 3, 2012

(65) Prior Publication Data

US 2013/0044770 A1    Feb. 21, 2013

Related U.S. Application Data

(60) Provisional application No. 61/524,211, filed on Aug. 16, 2011.

(51) Int. Cl.

| | | |
|---|---|---|
| H04B 10/17 | (2006.01) | |
| H01S 3/067 | (2006.01) | |
| H01S 3/10 | (2006.01) | |
| H01S 3/23 | (2006.01) | |
| H01S 3/13 | (2006.01) | |
| H01S 3/16 | (2006.01) | |

(52) U.S. Cl.
CPC ......... *H01S 3/06754* (2013.01); *H01S 3/10015* (2013.01); *H01S 3/2383* (2013.01); *H01S 3/1307* (2013.01); *H01S 3/1618* (2013.01); *H01S 2301/03* (2013.01)
USPC ............... 359/337; 359/341.1; 359/341.4; 359/349

(58) Field of Classification Search
USPC .................... 359/337, 341.1, 341.4
See application file for complete search history.

(56) References Cited

U.S. PATENT DOCUMENTS

| | | | |
|---|---|---|---|
| 6,366,356 B1 * | 4/2002 | Brosnan et al. ............... | 356/477 |
| 6,678,294 B1 | 1/2004 | Komine et al. | |
| 7,848,370 B2 * | 12/2010 | Kewitsch et al. ........ | 372/29.011 |
| 7,995,630 B2 * | 8/2011 | Rakuljic .................. | 372/29.011 |
| 2006/0239312 A1 * | 10/2006 | Kewitsch et al. ........ | 372/29.023 |
| 2007/0086713 A1 * | 4/2007 | Ingmar et al. ................. | 385/122 |
| 2009/0245306 A1 * | 10/2009 | Rakuljic .................. | 372/29.011 |

OTHER PUBLICATIONS

Goodno, et al., "Active phase and polarization locking of a 1.4 kW fiber amplifier," Opt. Lett. 35, 1542 (2010).
Augst, et al., "Coherent beam combining and phase noise measurements of ytterbium fiber amplifiers," Opt. Lett. 29, 474 (2004).

* cited by examiner

*Primary Examiner* — Eric Bolda
(74) *Attorney, Agent, or Firm* — William A Blake

(57) ABSTRACT

A chirped diode laser (ChDL) is employed for seeding optical amplifiers and/or dissimilar optical paths, which simultaneously suppresses stimulated Brillouin scattering (SBS) and enables coherent combination. The seed spectrum will appear broadband to suppress the SBS, but the well-defined chirp will have the coherence and duration to allow the active phasing of multiple amplifiers and/or dissimilar optical paths. The phasing is accomplished without optical path-length matching by interfering each amplifier output with a reference, processing the resulting signal with a phase lock loop, and using the error signal to drive an acousto-optic frequency shifter at the front end of each optical amplifier and/or optical path.

10 Claims, 1 Drawing Sheet

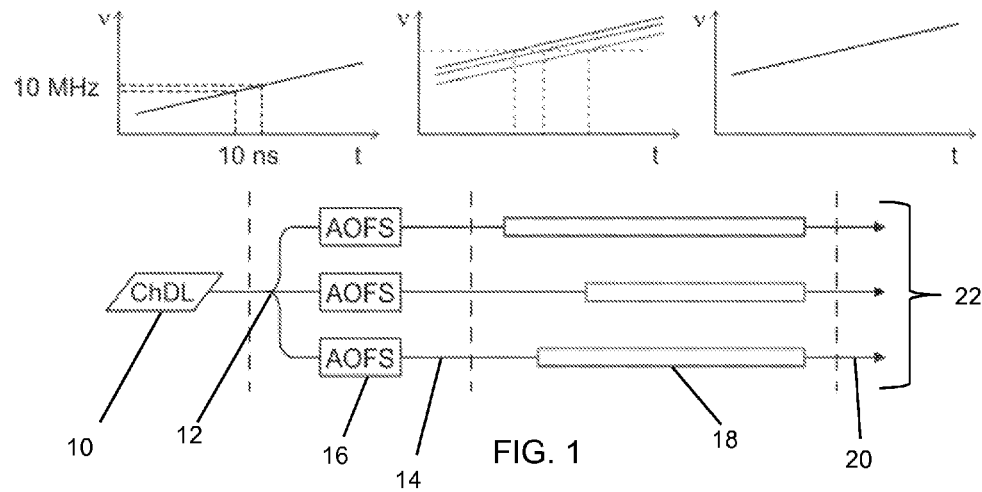
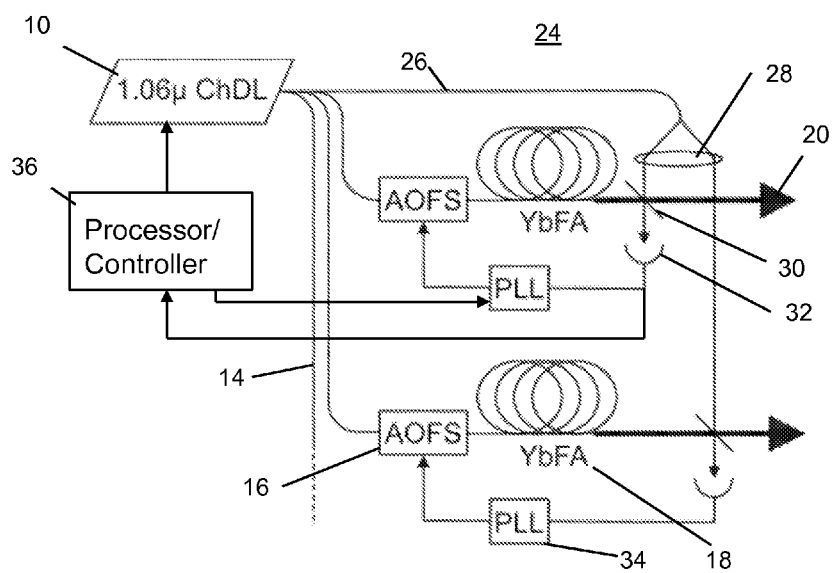
FIG. 3

FREQUENCY-CHIRPED SEMICONDUCTOR DIODE LASER PHASE-LOCKED OPTICAL SYSTEM

CROSS REFERENCE TO RELATED APPLICATIONS

This application claims the benefit under 35 USC 119(e) of U.S. Provisional Application No. 61/524,211, filed Aug. 16, 2011, which is hereby incorporated by reference in its entirety.

BACKGROUND OF THE INVENTION

1. Field of the Invention

This invention relates to a semiconductor laser system, in particular, to an optical system comprised of a frequency-chirped semiconductor laser diode and dissimilar optical paths that are electronically phase-locked.

2. Description of the Background Art

Techniques to control the amplitude and phase of semiconductor laser diodes promise to extend the performance of laser diode systems and thereby enable a wide range of new applications. Presently, semiconductor lasers exhibit several favorable attributes, including low cost, small size and high electrical efficiency, which have made them key elements in communications systems and high power laser systems (e.g., for pumping fiber lasers). One limitation of the latter application, however, is that as the optical power of semiconductor diode lasers and fiber lasers increases, several factors begin to degrade the spectral and spatial quality of the optical output beam. For example, stimulated Brillioun scattering (SBS) can seriously degrade the optical performance of typical implementations of a high power laser and is a major factor limiting the output power of a fiber amplifier.

SBS limits the power of optical amplifiers to <1 KW. Thus, to achieve a high power (>100 KW) laser beam using efficient fiber or solid-state optical amplifiers, one needs to combine the output from multiple amplifiers. Previously, different approaches have been taken to solve the SBS problem. One approach is to suppress SBS by a broadband, phase modulated, or frequency modulated laser (seed) input to increase output power per amplifier to >1 KW; and combine fewer outputs into a high power beam.

For example, in S. Augst, et al., "Coherent beam combining and phase noise measurements of ytterbium fiber amplifiers," *Opt. Lett.* 29, 474 (2004), a 25 GHz bandwidth laser seed was employed to suppress SBS (~100 MHz linewidth) and an acousto-optic frequency shifter (AOFS) was used to phase-lock the path length matched fiber outputs for coherent beam combining Similarly, in G. Goodno, et al., "Active phase and polarization locking of a 1.4 kW fiber amplifier," *Opt. Lett.* 35, 1542 (2010), a 25 GHz bandwidth phase-modulated laser seed was used to suppress SBS and an electro-optic phase modulator and a variable delay line were used to phase-lock and equalize path mismatch for coherent beam combining.

U.S. Pat. No. 6,678,294, issued Jan. 13, 2004 and entitled, "Distributed feedback laser apparatus for avoiding stimulated Brillouin scattering," discloses use of a frequency-modulated DFB seed laser to produce a sawtooth waveform with a period that is no greater than a round trip optical transit time associated with each of the fiber amplifiers to suppress SBS, and phase adjusting means for coherent beam combining.

The main shortcoming of these previous approaches is that the use of a broadband or rapidly modulated seed laser requires strict optical path length matching (<1 mm) of the amplifier paths (>10 to 100 meters) to achieve phase-locking and coherent beam combining. This is normally accomplished by precisely fabricating or cutting optical amplifier path lengths to match and adding mechanical apparatus to eliminate the residual path length errors.

The nonlinearities become more serious for narrow linewidth, single frequency amplifiers suitable for coherent combining Single frequency Ytterbium (Yb), Erbium (Er) and Prasedymium (Pr)-doped fiber lasers and amplifiers utilizing semiconductor diode pump lasers provide limited power (<100's W) before the onset of SBS linewidth broadening, which destroys the mutual coherence of the seed laser and prevents the coherent combination of their outputs.

SUMMARY OF THE INVENTION

The present invention overcomes the foregoing shortcomings of the prior art with an arrangement in which multiple optical amplifiers are seeded with a highly chirped diode laser so that (a) the spectrum appears broadband in order to suppress the SBS, but (b) the chirp duration is longer than the round trip optical transit time and the frequency variation is extremely well-defined so that the outputs from the multiple amplifiers or optical paths can be coherently combined with acousto-optic frequency shifters, for example, even in the presence of large optical path-length mismatches.

In a preferred embodiment, the phasing is accomplished without optical path-length matching by interfering each amplifier output with a reference, processing the resulting signal with a phase lock loop, and using the error signal to drive an acousto-optic frequency shifter at the front end of each fiber amplifier and/or optical path. In contrast to the previously discussed prior art systems, the presently disclosed method can electronically compensate for path length differences up to 1 m or more. This advance will make it easier to construct the optical system in the first place, and much easier to replace an amplifier chain and/or optical path length in the field.

To accomplish the foregoing, a linearly-chirped narrow linewidth seed of sufficiently large chirp rate is employed to suppress SBS as already noted. However, in contrast to the system disclosed in U.S. Pat. No. 6,678,294, the chirp has a period or duration that is substantially greater than a round trip optical transit time associated with each of the optical amplifiers or the SBS response time. As a result, for coherent beam combining, the AOFSs electronically compensate for path length mismatch and phase-lock in real-time during the chirp, which can be indefinitely repeated in a sawtooth or triangular fashion. Critical fabrication of optical amplifier path lengths or use of mechanical apparatus such as delay lines are not needed for path equalization and phase locking to simultaneously achieve SBS suppression and coherent beam combining.

BRIEF DESCRIPTION OF THE DRAWINGS

The features and advantaged of the invention will become apparent from the following detailed description of a preferred embodiment thereof, taken in conjunction with the accompanying drawings, which are briefly described as follows.

FIG. 1 is a schematic diagram of a linearly chirped diode laser seeding a plurality of fiber amplifiers and/or optical paths of dissimilar lengths in accordance with a preferred embodiment of the present invention. Acousto-optic frequency shifters are used to compensate for frequency variations induced by the dissimilar path lengths.

FIGS. 2A-2C are graphs depicting the frequency vs. time of a number of output signals. FIG. 2A shows the output of the chirped diode laser; FIG. 2B shows the frequency mismatched outputs of 3 dissimilar length fiber amplifiers; and FIG. 2C shows the frequency of a combined output power signal after the signals from the fiber amplifiers have been matched through frequency shifting and then coherently combined.

FIG. 3 is a schematic block diagram depicting a detailed view of a preferred embodiment of the invention.

DETAILED DESCRIPTION OF A PREFERRED EMBODIMENT

With reference to FIG. 1, the basic elements that are employed to implement the concepts of the present invention are illustrated. These elements include a highly-chirped diode laser (ChDL) 10 which has a chirp rate selected to be high enough to suppress the effects of SBS. In the preferred embodiment and as illustrated in the graph of FIG. 2A, a chirp rate of 10 MHz/10 ns or $10^{15}$ Hz/s is employed. A chirp rate of at least $10^{14}$ Hz/s should be employed to insure suppression of the effects of SBS.

The frequency chirped output from the ChDL 10 is fed through a fiber splitter 12 to a plurality of parallel optical paths 14, each with a fiber-coupled acousto-optic frequency shifter (AOFS) 16 and a single-mode fiber amplifier 18. Each of the fiber amplifiers 18 has a path length that is dissimilar from one another as a result, for example, of normal variations in manufacturing tolerances. Without the use of the AOFS's 16, the dissimilar path lengths of the fiber amplifiers 18 would cause the frequencies of their output signals 20 to be shifted relative to one another as illustrated in FIG. 2B. However, the use of the AOFS's 16 facilitate path length compensation and formation of a coherently combined power output signal 22 that has only one frequency component as illustrated in FIG. 2C. It should be understood that although three optical paths 14 are illustrated in FIG. 1, any desired number of paths could be employed to provide a desired combined output power.

FIG. 3 illustrates a preferred embodiment of the present invention in greater detail which comprises a high power laser system 24 that implements the elements of FIG. 1, among others. The laser system 24 employs a ChDL 10 that is specifically a 1.06 um wavelength laser that is suitable for seeding Ytterbium (Yb) fiber amplifiers 18 (YbFA). Alternatively, other known doped fibers, such as Erbium (Er) and Prasedymium (Pr)-doped fibers can be used to form the fiber amplifiers 18, but the wavelength of the ChDL 10 would have to be adjusted accordingly (e.g., 1.5 μm for Er).

In addition to providing inputs to the optical paths 14, the ChDL 10 also provides an input to a reference path 26 whose output signal is passed through a suitable lens 28 and then combined with the output signal 20 of each YbFA 18 via a corresponding beamsplitter 30. Combined with each YbFA 18, the reference arm 26, lens 28 and beamsplitter 30 form an interferometer which generates an output phase signal that is detected by a photodetector (PD) 32. In response, the PD 32 sends a feedback control signal to an optical phase-lock loop (PLL) 34. The waveform to each AOFS 16 is controlled by the optical PLL 34 so that the amplifier outputs 20 are maintained in phase despite path-length mismatch and initial or transient variations in fiber length. An exemplary commercial AOFS that is suitable for use in the preferred embodiment is a Brimrose model AMF-100-20-1060-2FP.

To control operation of the system 24, a processor/controller 36 is provided that controls operation of the ChDL 10 and PLL 34 and receives the output signals from each PD 32. It should be noted that FIG. 3 only shows the connections between the processor/controller 36 and the PD 32 and PLL 34 of the first fiber amplifier 18 for clarity but it will be understood that the same connections will be made with each path 14 in the system 24.

Thus, in the present invention, the compensation for amplifiers and/or optics of different path lengths is achieved electronically through the use of acousto-optic frequency shifters by providing the appropriate optical frequency offset to the chirped light in each path and not just the phase noise or error correction as in the prior art, since a path length difference is equivalent to a frequency shift for a linear optical chirp. For a given chirp rate α, and a maximum frequency shift of $\Delta v_{max}$, the maximum path length difference that can be compensated is given by:

$$L_{max}=(c \cdot \Delta v_{max})/(n \cdot \alpha)$$

For a diode laser tuning range of χ, the period of the chirp is given by:

$$\tau = \chi/\alpha$$

Representative values of the mismatch tolerance, chirp period, and chirp length (cT/n) are given in Table 1 for $\Delta v_{max}=10$ MHz (note that the Brimrose model AMF-100-20-1550-2FP imposes a shift of 100±10 MHz) and a diode laser tuning range of χ=100 GHz. The chirp lengths are much longer (e.g. at least one order of magnitude) than the 15 m final stage of a typical high power fiber amplifier, so a Stokes wave will never be in resonance with the laser more than once.

TABLE 1

| Mismatch tolerance, chirp period, and chirp length for two values of chirp. | | | |
| --- | --- | --- | --- |
| Chirp rate α (Hz/s) | Mismatch Tolerance $L_{max}$ (m) | Chirp period τ (μs) | Chirp length (km) |
| $10^{15}$ Hz/s | 2 | 100 | 21 |
| $10^{16}$ Hz/s | 0.2 | 10 | 2.1 |

Although the invention has been disclosed in terms of a preferred embodiment and variations thereon, it will be understood that numerous other variations and modifications could be made thereto without departing from the scope of the invention as set forth in the following claims.

The invention claimed is:

1. A high power semiconductor laser system comprising:
a chirped diode laser generating an output with a frequency that changes as a function of time;
at least first and second amplifier paths for receiving said chirped diode laser output and generating first and second amplified outputs, each of said paths including an optical frequency shifter and an optical amplifier, said first amplifier path having a length that is different from a length of said second amplifier path;
first and second optical phase locked loops for controlling said first and second optical frequency shifters, respectively;
a detector for detecting a phase difference between said laser output and each of said amplified outputs and employing each said phase difference to control said first and second phase locked loops, respectively, to thereby impart a frequency shift to each of said amplified outputs that compensates for the difference in path lengths to enable coherent beam combining of said amplified outputs; and means for combining said first and second amplified outputs to form a high power laser output;

wherein said chirped diode laser is selected to have a chirp rate that compensates for stimulated Brillouin scattering (SBS) and a chirp duration that results in a chirp length that is substantially greater than the lengths of either of said first and second amplifier paths.

2. The laser system of claim 1, wherein each of said optical frequency shifters is an acousto-optic frequency shifter (AOFS).

3. The laser system of claim 1, wherein the chirp rate is selected to be at least $10^{14}$ Hz per second and the chirp length is selected to be at least one order of magnitude longer than the path length of either of said first and second amplifier paths.

4. The laser system of claim 1, wherein each of said optical amplifiers is a fiber amplifier.

5. The laser system of claim 1, wherein each of said fiber amplifiers is doped from an element selected from the group comprising Ytterbium (Yb), Erbium (Er) and Prasedymium (Pr).

6. A method for generating a high power laser output comprising the steps of:

generating an output with a chirped diode laser (ChDL), said ChDL output having a frequency that changes as a function of time;

passing said ChDL output through at least first and second parallel amplifier paths, each of said paths including an optical frequency shifter and an optical amplifier for generating an amplified laser output, said first amplifier path having a length that is different from a length of said second amplifier path; and detecting a phase difference between said laser output and each of said amplified outputs and employing each said phase difference to control first and second optical phase locked loops, for controlling said first and second optical frequency shifters, respectively, and thereby imparting a frequency shift to each of said amplified outputs that compensates for the difference in path lengths to enable coherent beam combining of said amplified outputs; and combining said first and second laser outputs to form a high power laser output;

wherein said chirped diode laser is selected to have a chirp rate that compensates for stimulated Brillouin scattering (SBS) and a chirp duration that results in a chirp length that is substantially greater than the lengths of either of said first and second amplifier paths.

7. The method of claim 6, wherein each of said optical frequency shifters is selected to be an acousto-optic frequency shifter (AOFS).

8. The method of claim 6, wherein the chirp rate of said ChDL is selected to be at least $10^{14}$ Hz per second and the chirp length is selected to be at least one order of magnitude longer than the path length of either of said first and second amplifier paths.

9. The method of claim 6, wherein each of said optical amplifiers is selected to be a fiber amplifier.

10. The method of claim 9, wherein each of said fiber amplifiers is doped from an element selected from the group comprising Ytterbium (Yb), Erbium (Er) and Prasedymium (Pr).

* * * * *